United States Patent
Rößner et al.

(10) Patent No.: US 11,686,376 B2
(45) Date of Patent: Jun. 27, 2023

(54) CONNECTING SECTION FOR A TWO-PART HUB, A TWO-PART HUB AND A HYBRID DRIVE MODULE

(71) Applicant: ZF FRIEDRICHSHAFEN AG, Friedrichshafen (DE)

(72) Inventors: Monika Rößner, Donnersdorf (DE); Gerald Viernekes, Hassfurt (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/551,612

(22) Filed: Dec. 15, 2021

(65) Prior Publication Data

US 2022/0196127 A1  Jun. 23, 2022

(30) Foreign Application Priority Data

Dec. 17, 2020 (DE) ..................... 10 2020 216 182.8

(51) Int. Cl.
- *F16H 45/02* (2006.01)
- *F16H 41/24* (2006.01)
- *B60K 6/387* (2007.10)

(52) U.S. Cl.
CPC ............. *F16H 45/02* (2013.01); *B60K 6/387* (2013.01); *F16H 41/24* (2013.01); *F16H 2041/246* (2013.01); *F16H 2045/0284* (2013.01)

(58) Field of Classification Search
CPC ....... F16D 41/00–2045/0294; B60K 6/20–547
See application file for complete search history.

(56) References Cited

U.S. PATENT DOCUMENTS

| | | | |
|---|---|---|---|
| 2003/0075409 A1* | 4/2003 | Bauer | F16H 45/02 192/55.61 |
| 2008/0023287 A1* | 1/2008 | Thiede | B60L 50/16 192/48.1 |
| 2011/0121692 A1* | 5/2011 | Iwase | F16D 25/123 192/85.01 |

FOREIGN PATENT DOCUMENTS

| | | | |
|---|---|---|---|
| DE | 19953172 A1 * | 5/2001 | F16H 41/24 |
| DE | 102018205473 | 10/2019 | |
| DE | 102018205475 | 10/2019 | |

OTHER PUBLICATIONS

Definition of "section", Cambridge dictionary, Feb. 16, 2023, 1 page. (Year: 2023).*
Office Action of the corresponding German Patent Application No. 10 2020 216 182.8.

* cited by examiner

*Primary Examiner* — Ernesto A Suarez
*Assistant Examiner* — Lillian T Nguyen
(74) *Attorney, Agent, or Firm* — Cozen O'Connor

(57) ABSTRACT

Connecting section for a two-part hub that support a driven shaft of a hybrid drive module having a first hub section and a second hub section. The connecting section can be arranged coaxially with the first hub section and the second hub section and can be arranged between the first hub section and the second hub section. The connecting section is designed as a sliding bearing.

9 Claims, 2 Drawing Sheets

CONNECTING SECTION FOR A TWO-PART HUB, A TWO-PART HUB AND A HYBRID DRIVE MODULE

BACKGROUND OF INVENTION

1. Field of the Invention

The present disclosure relates to a connecting section for a two-part hub, to a two-part hub, and to a hybrid drive module.

2. Description of Related Art

Hybrid drive modules can be an integral component of a motor vehicle transmission or can be designed as an independent unit with at least one interface with a motor vehicle transmission. Hybrid drive modules are used, for example, in a hybrid vehicle to operate an electric machine that can be operated as a drive motor or generator, and an internal combustion engine in a manner such that they can be coupled to one another.

Hybrid drive modules have a central hub for supporting and bearing input and output shafts in hybrid drive modules.

SUMMARY OF THE INVENTION

Although, in principle, hybrid drive modules and corresponding central hubs are known, it is an object of one aspect of the present invention is a connecting section for a two-part hub, a two-part hub and a hybrid drive module.

One aspect of the present invention is a connecting, a two-part hub, and a hybrid drive module.

One aspect of the invention relates to a connecting section for a two-part hub, designed to support a driven shaft of a hybrid drive module and has a first hub section and a second hub section. The connecting section can be arranged coaxially with the first hub section and the second hub section and can be arranged between the first hub section and the second hub section. The connecting section is designed as a sliding bearing.

The hub is a machine element that can be pushed onto a shaft, an axle or the like, for example. Thus, the driven shaft of the hybrid drive module can be pushed into the hub and supported therein. For this purpose, corresponding bearings and bearing locations can be provided in the hub.

The hub has the first hub section and the second hub section. In other words, the hub is embodied in at least two parts.

The two-part hub can be used as a central hub for the hybrid drive module of a motor vehicle. The hybrid drive module has an input shaft, the abovementioned driven shaft, an electric machine with a non-rotatable stator and a rotatable rotor, a (separating) clutch in the power transmission path between the input shaft and the rotor, and a torque converter, the housing of which is connected to the rotor for conjoint rotation therewith. The torque converter has a lock-up clutch, which is arranged within the housing thereof and is designed to bridge the hydrodynamic path of the torque converter, that is to say to mechanically connect the pump impeller and the turbine wheel of the torque converter. The input shaft is generally connected to an internal combustion engine of the motor vehicle in order to allow power to be introduced from the internal combustion engine into the hybrid drive module. By the input shaft, a rotary motion of the internal combustion engine can be transmitted to the separating clutch. The driven shaft is connected to a turbine shaft of the torque converter for conjoint rotation therewith, and therefore the hybrid drive module is connected via the driven shaft to the further drive train of the motor vehicle, such as, for example, a transmission.

By the clutch, the internal combustion engine can be coupled to and decoupled from the hybrid drive module. In this case, the clutch can be designed as a multi-disc clutch.

The first hub section comprises a rotor hub and serves to support the rotor of the electric machine on the input shaft. For this purpose, a bearing is generally provided between the rotor hub and the input shaft. In some embodiments, the first hub section is the rotor hub.

The second hub section of the two-part hub comprises the turbine shaft. In some embodiments, the second hub section is the turbine shaft.

The connecting section, the first hub section, and the second hub section each have a longitudinal axis. The connecting section can be arranged coaxially with the first and the second hub section in the hybrid drive module. That is to say that they can be arranged in the hybrid drive module such that their longitudinal axes coincide. Furthermore, the connecting section can be arranged between the first hub section and the second hub section, as seen in the longitudinal axis direction. As a rule, the connecting section, the first hub section, and the second hub section can be arranged adjacent to one another. In some embodiments, further elements can be provided between the connecting section, the first hub section, and the second hub section.

Depending on the setting of the lock-up clutch, there can be different rotational speeds between the first hub section and the second hub section. In other words, there can be different speeds between the rotor hub (first hub section) and the turbine shaft (second hub section). The connecting section is therefore designed as a sliding bearing. In other words, the connecting section is designed as a sliding element. In this case, the sliding bearing or sliding element can comprise a rotating ring or a sliding sleeve.

The connecting section can be arranged between the first hub section and the second hub section and can be arranged coaxially with the hub sections, thus enabling the first hub section and the second hub section to be arranged so as to slide with respect to one another (via the connecting section). By virtue of the connecting section designed as a sliding bearing, friction occurring due to the differential speed between the first hub section and the second hub section, which would be in contact via corresponding contact surfaces without the connecting section and thus wear on the corresponding contact surfaces is reduced. Thus, a more robust and comparatively durable hybrid drive module can be provided. Furthermore, the second hub section can be mounted with the connecting section in the axial direction against the first hub section. This enables a compact construction of the two-part hub.

In some embodiments, the connecting section can be of cylindrical or annular design. Furthermore, the connecting section can be of rotationally symmetrical design.

As a rule, the connecting section, such as the two-part hub, is designed such that it can be pushed onto the driven shaft of the hybrid drive module. The connecting section therefore has a through-opening, which extends along the longitudinal axis of the connecting section. That is to say that the through-opening extends from one end to the other end of the connecting section.

In further embodiments, the connecting section can have a chamfer on its inner circumferential side. The chamfer is a bevelled surface on an edge of the connecting section. The chamfer can be arranged between the two ends of the connecting section. That is to say that the edge to be bevelled was present between the two ends of the connecting section. Alternatively, the chamfer can also be arranged at the end in the longitudinal direction of the connecting section. That is to say that the edge to be bevelled was an edge at one of the ends of the connecting section.

Furthermore, an angle of the chamfer, referred to as a chamfer angle, can be between 5° and 45° degrees. The chamfer angle is that angle which is located between the longitudinal axis of the connecting section and the chamfer.

When the driven shaft is inserted into the hub, the chamfer can simultaneously be used as a particularly simple way of applying sealing rings to the driven shaft or to corresponding receiving grooves running around the driven shaft. Therefore, the chamfer is provided as an aid for mounting sealing rings on the driven shaft.

according to one aspect of the invention, an insertion section can be arranged on an outer circumferential side of the connecting section, which is designed for inserting the connecting section into the first hub section. Thus, the connecting section can be introduced at least partially into the first hub section.

In further aspect of the invention, the insertion section can be designed as a step. Thus, the insertion section can be designed as a step extending around the outer circumferential side. In this case, the step then extends continuously around the outer circumferential side. Alternatively, it is also possible to provide a plurality of steps, which are arranged in a manner distributed at the same height along the connecting section and on the outer circumferential side. The plurality of steps can be of the same configuration. By way of a connecting section having the step, the connecting section can be inserted in a centred manner into the first hub section and can be supported therein radially and at least partially axially.

In one aspect of the invention, the connecting section can be formed from a material suitable for sliding bearings. Thus, in some embodiments, the connecting section can be formed from a plastic with antifriction properties, for example polyamide (e.g. stanyl) with a glass fibre component. In this case, the connecting section can be formed completely from the suitable material. Alternatively, the connecting section can be formed from the suitable material at least at contact surfaces which, in the installed state, are in contact with the first hub section and the second section. In other words, the connecting section can be formed from the suitable material at least at its contact surfaces which can be arranged in contact with the first hub section and the second hub section.

A second aspect of the present invention relates to a two-part hub for supporting a driven shaft, having:
a first hub section;
a second hub section; and
a connecting section according to one of the aspects described above,
wherein the connecting section is arranged between the first hub section and the second hub section, and is arranged coaxially with the first hub section and the second hub section.

The statements made about the first aspect of the present invention with respect to the two-part hub also apply to the two-part hub according to the above second aspect.

In further embodiments, the first hub section can have a receiving section at the end, which is designed to receive the connecting section. The term "at the end" refers to a side or surface of the hub section which, when viewed in the longitudinal direction of the hub section, is arranged at one of the two ends of the hub section.

In one aspect, the two-part hub can be designed to spatially separate the lock-up clutch from the clutch. Furthermore, the two-part hub can be designed to carry all the bearings for supporting the hybrid drive module. In other words, the two-part hub comprises corresponding bearing locations at which the bearings can be arranged. In this case, the two-part hub can receive at least one of the following bearings: a radial needle bearing for centring and guiding the input shaft, a radial needle bearing for supporting the input shaft against tilting, and a ball bearing for supporting the two-part hub in the hybrid drive module. In addition, the two-part hub can be designed to supply at least one of the following with fresh oil, for example via corresponding hub sections and/or via feed lines provided in the two-part hub: a clutch-side pressure chamber, the clutch, a lock-up-clutch-side pressure chamber and the lock-up clutch. In some aspects, the two-part hub can be designed to fulfil all the functions described above.

For example, the receiving section can be designed to correspond to the above-described insertion section of the connecting section. Thus, the receiving section can be designed as a step on an inner circumferential side of the first hub section.

A third aspect of the present invention relates to a hybrid drive module for a motor vehicle, having:
the two-part hub according to the aspects described above;
an electric machine; and
a torque converter;
wherein the second hub section comprises a turbine shaft of the torque converter.

The statements made about the first aspect of the present invention with respect to the two-part hub and the hybrid drive module also apply to the hybrid drive module according to the above third aspect.

BRIEF DESCRIPTION OF THE DRAWINGS

Aspects of the invention are now described by way of example and with reference to the attached drawings. In this case.

DETAILED DESCRIPTION OF THE PRESENTLY PREFERRED EMBODIMENTS

Figure 1:
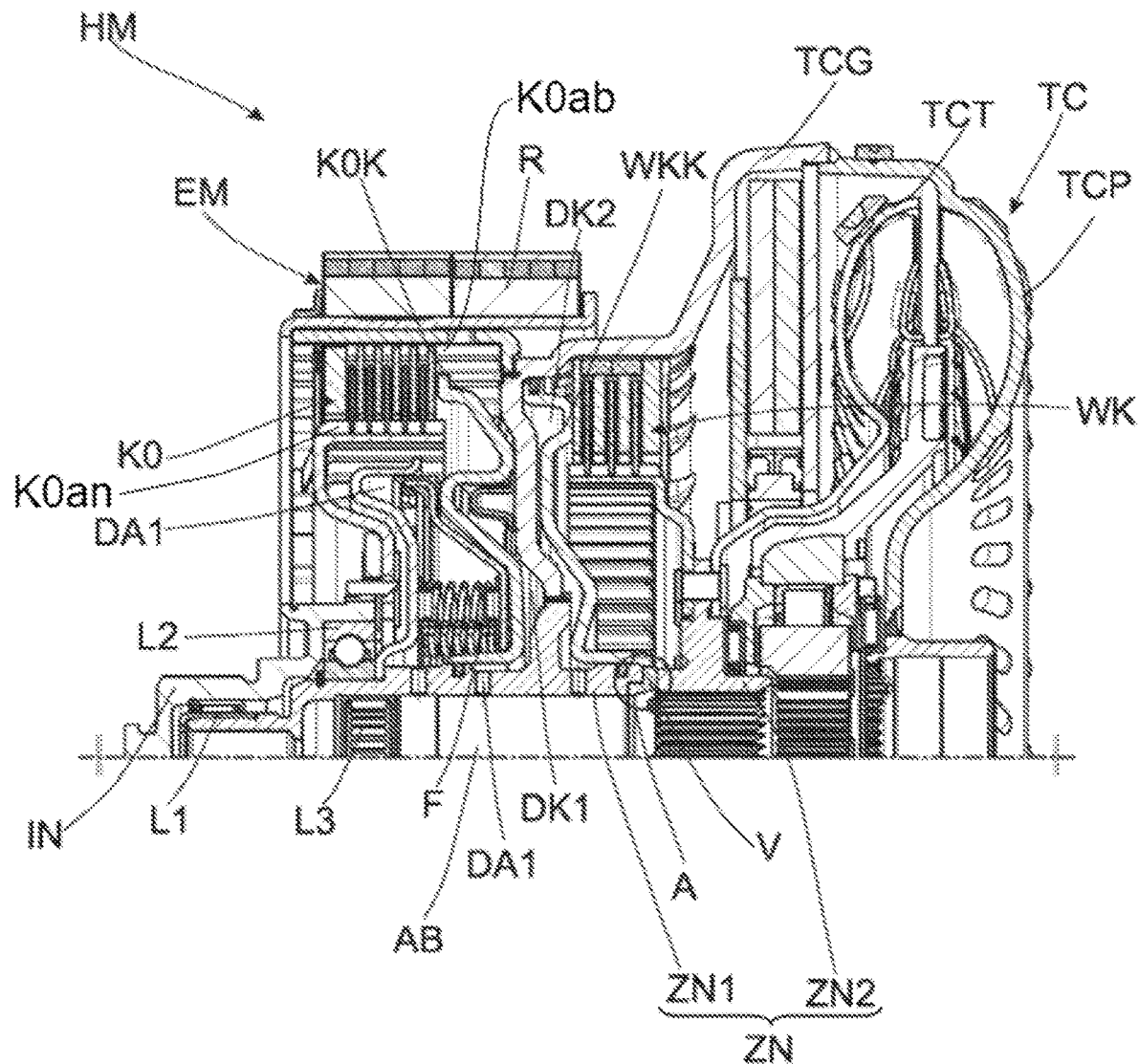
FIG. 1 is a sectional view of a hybrid drive module.

FIG. 1 shows a sectional view of a hybrid drive module HM for a drive train of a motor vehicle. The hybrid drive module HM has a housing, in which an electric machine EM having a rotor R and a non-rotatable stator, and a clutch K0 are arranged.

The clutch K0 comprises a first clutch half K0*an* and a second clutch half K0*ab*. The first clutch half K0*an* comprises an inner disc carrier of the clutch K0, which is connected to an input shaft IN for conjoint rotation therewith. The input shaft is the crankshaft of an internal combustion engine. The second clutch half K0*ab* comprises an outer disc carrier of the clutch K0. The rotor R is connected to the outer disc carrier and to a first hub section ZN1 of a two-part hub ZN for conjoint rotation therewith. Thus, the first hub section ZN1 can also be referred to as a rotor hub.

The rotor R is rotatably supported on the input shaft IN via the first hub section ZN1. For this purpose, a ball bearing L1 is arranged between the first hub section ZN1 and the input shaft and is designed to support radially and axially acting forces. In some examples, the bearing L1 can be designed as a single-row deep-groove ball bearing.

The hybrid drive module HM has a torque converter TC. The first hub section ZN1 is connected to a converter housing TCG of the torque converter TC for conjoint rotation therewith, and therefore the first hub section ZN1 and the converter housing TCG rotate about a common axis AX.

By the clutch K0, the electric machine EM can be coupled to and decoupled from the internal combustion engine. The clutch K0 can be actuated hydraulically. A first pressure chamber DK1, which is arranged outside the housing TCG, is provided for actuating the separating clutch K0. If the pressure in the first pressure chamber DK1 is increased, a first piston K0K is moved in the direction of a disc set of the clutch K0 against the force of a return spring F. The clutch K0 can thus be actuated in the closing direction by pressurizing the first pressure chamber DK1. At the end of the first piston K0K remote from the first pressure chamber DK1, a pressure compensation chamber DA1 is provided, which is delimited in the axial direction by a baffle plate.

A pump impeller TCP of the torque converter TC is connected to the converter housing TCG for conjoint rotation therewith. A turbine wheel TCT of the torque converter TC is connected to a second hub section ZN2 of the two-part hub. The second hub section ZN2 is a turbine shaft of the torque converter TC. The second hub section is connected to a driven shaft AB. The driven shaft can be a transmission input shaft of a transmission.

The torque converter TC has a lock-up clutch WK, which is arranged within the housing TCG and is designed to make the pump impeller TCP and the turbine wheel TCT of the torque converter TC couplable and thus to short-circuit the hydrodynamic path of the torque converter TC mechanically. Thus, the converter housing TCG can also be coupled to the second hub section ZN2 by the lock-up clutch WK. The lock-up clutch WK can be designed as a multi-disc clutch.

The lock-up clutch WK can be actuated hydraulically. A second pressure chamber DK2, which is arranged within the housing TCG, is provided for actuating the lock-up clutch WK. If the pressure in the second pressure chamber DK2 is increased, a second piston WKK is moved in the direction of a disc set of the lock-up clutch WK against the force of a further return spring (not illustrated in FIG. 1). The lock-up clutch WK can thus be actuated in the closing direction by pressurizing the second pressure chamber DK2. At the end of the second piston WKK remote from the second pressure chamber DK2, a pressure compensation chamber is provided, which corresponds to an oil-filled converter chamber of the torque converter TC. By the oil cushion in the converter chamber, pressure fluctuations acting on the second piston WKK can be compensated.

The first hub section ZN1 is designed as a hollow shaft, which is arranged coaxially with the driven shaft AB and surrounds the latter. In the example shown, the input shaft IN is likewise in the form of a hollow shaft and is arranged coaxially with respect to the first hub section ZN1. A plurality of bearings L1, L2, L3 is provided between the driven shaft AB and the first hub section ZN1, between the first hub section ZN1 and the input shaft IN, and between the input shaft IN and the housing of the hybrid drive module HM, said bearings supporting the components with respect to one another.

Figure 2:
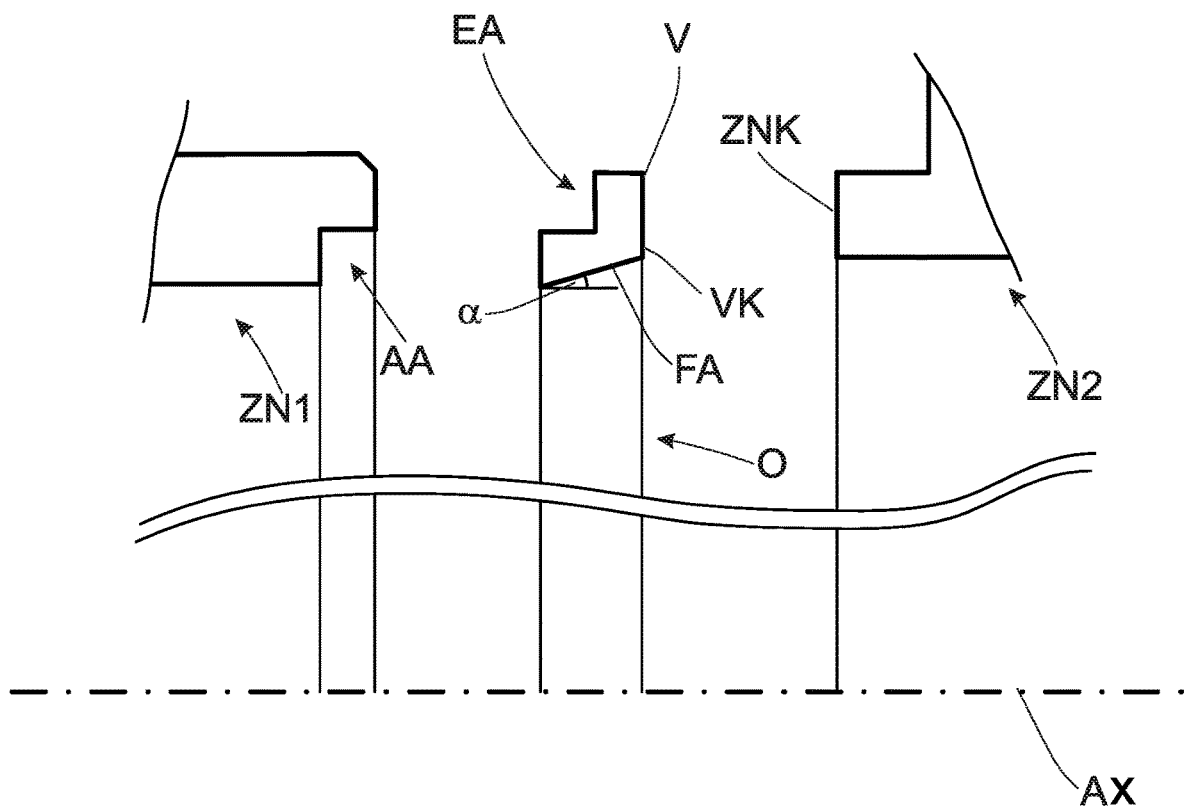
FIG. 2 is an enlarged illustration of a region A from FIG. 1.

FIG. 2 shows an enlarged and exploded illustration of region A in FIG. 1.

The first hub section ZN1 has a receiving section AA at its end. In the assembled state of the hybrid drive module HM, the receiving section AA is arranged on an end side or end surface of the first hub section ZN1 facing the connecting section V. The receiving section AA is designed to receive the connecting section V. For this purpose, the receiving section AA is arranged on an inner circumferential side of the first hub section AA and is designed as a step.

The connecting section V has an insertion section EA at the end. In the assembled state of the hybrid drive module HM, the insertion section EA is arranged on an end side or end face of the connecting section V facing the first hub section ZN1. The insertion section EA is designed for insertion of the connecting section V into the first hub section ZN1. The insertion section EA is designed to correspond to the receiving section AA. For this purpose, the insertion section EA is arranged on an outer circumferential side of the connecting section V and is designed as a step. The insertion section EA is thus a seat for the connecting section V.

Furthermore, the connecting section V has a chamfer FA on its inner circumferential side. The chamfer FA is designed in such a way that, when viewed in the direction of the longitudinal axis AX, an inside diameter of the connecting section V increases towards an end side of the connecting section V. In other words, a diameter of a through-opening O of the connecting section V increases. The chamfer angle $\alpha$ can be between 5° and 55°. The chamfer FA simplifies the application of sealing rings to the driven shaft AB when the driven shaft AB is inserted into the two-part hub ZN.

The connecting section V has a first contact surface VK at its end. In the assembled state of the hybrid drive module HM, the first contact surface VK is arranged on an end side or end surface of the connecting section V facing the second hub section ZN2. In the present case, the contact surface VK is of flat design.

The second hub section ZN2 has a second contact surface ZNK at the end designed to correspond to the first contact surface VK. Thus, in the present case, the second contact surface ZNK is of flat design. In the assembled state of the hybrid drive module HM, the second contact surface ZNK is arranged on an end side or end surface of the second hub section ZN2 facing the connecting section V.

The first hub section ZN1, the connecting section V and the second hub section ZN2 can be arranged in such a way that the receiving section AA and the insertion section EA and/or the first contact surface VK and the second contact surface are in contact. Contact between the first hub section ZN1 and the second hub section ZN2 can thus be avoided by the connecting section V. During operation of the hybrid drive module HM, in which the lock-up clutch WK is open, that is to say the first hub section ZN1 rotates at a different rotational speed than the second hub section ZN2, a difference in the rotational speeds can thus be compensated for by the connecting section V. As a result, the second hub section ZN1 can be supported against the first hub section ZN1 in the axial direction. This permits a compact construction of the hybrid drive module HM when viewed in the direction of the axis AX.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A connecting section for a two-part hub, configured to support a driven shaft of a hybrid drive module, comprising:
    a first hub section; and
    a second hub section,
    wherein the connecting section is arranged coaxially with the first hub section so that a radially inner end of the connecting section is radially inside the first hub section,
    wherein the connecting section is nonoverlapping with the second hub section,
    wherein the connecting section is arranged axially between the first hub section and the second hub section, and
    wherein the connecting section is a sliding bearing,
    wherein the first hub section and the second hub section are each rotatable with respect to the connecting section.

2. The connecting section according to claim 1, wherein the connecting section has a chamfer on an inner circumferential side.

3. The connecting section according to claim 1,
    wherein an insertion section is arranged on an outer circumferential side of the connecting section, and
    wherein the insertion section is configured for inserting the connecting section into the first hub section.

4. The connecting section according to claim 3, wherein the insertion section is a step.

5. The connecting section according to claim 1, wherein the connecting section is a plastics material.

6. A two-part hub configured to support a driven shaft, comprising:
    a first hub section;
    a second hub section; and
    a connecting section,
    wherein the connecting section is arranged coaxially with the first hub section so that a radially inner end of the connecting section is radially inside the first hub section,
    wherein the connecting section is nonoverlapping with the second hub section,
    wherein the first hub section and the second hub section are each rotatable with respect to the connecting section, and
    wherein the connecting section is arranged coaxially with the first hub section and the second hub section.

7. The two-part hub according to claim 6, wherein the first hub section has, at a first end, a receiving section, configured to receive the connecting section.

8. A hybrid drive module for a motor vehicle, comprising:
    a two-part hub configured to support a driven shaft, comprising:
        a first hub section;
        a second hub section; and
        a connecting section,
        wherein the connecting section is arranged between the first hub section and the second hub section,
        wherein the first hub section and the second hub section are each rotatable with respect to the connecting section, and
        wherein the connecting section is arranged coaxially with the first hub section so that a radially inner end of the connecting section is radially inside the first hub section,
        wherein the connecting section is nonoverlapping with the second hub section,
        wherein the connecting section is arranged coaxially with the first hub section and the second hub section,
    an electric machine; and
    a torque converter;
    wherein the second hub section comprises a turbine shaft of the torque converter.

9. The connecting section according to claim 1, wherein the first hub section and the second hub section are each directly adjacent to the connecting section.

* * * * *